May 12, 1931.　　　I. BENJAMINS　　　1,804,493
FLUID MOTOR
Filed June 7, 1928　　　3 Sheets-Sheet 1
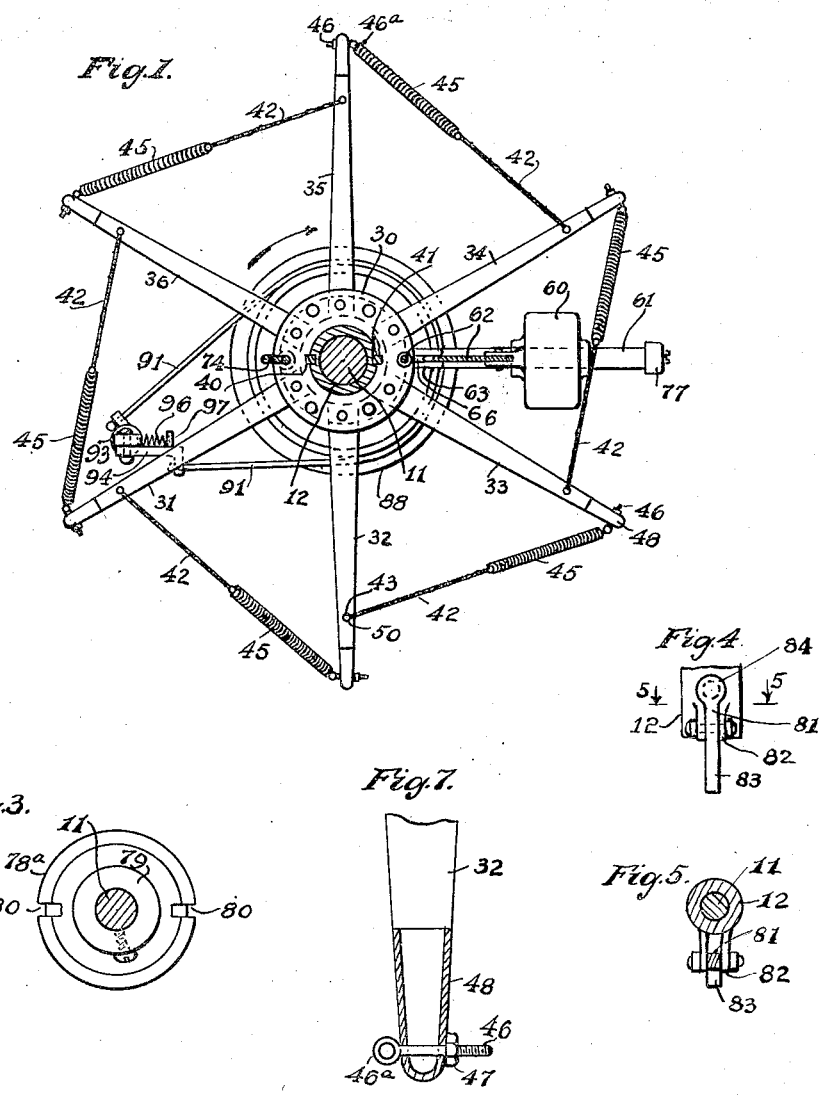
Inventor:
Israel Benjamins.

May 12, 1931.  I. BENJAMINS  1,804,493
FLUID MOTOR
Filed June 7, 1928   3 Sheets-Sheet 2
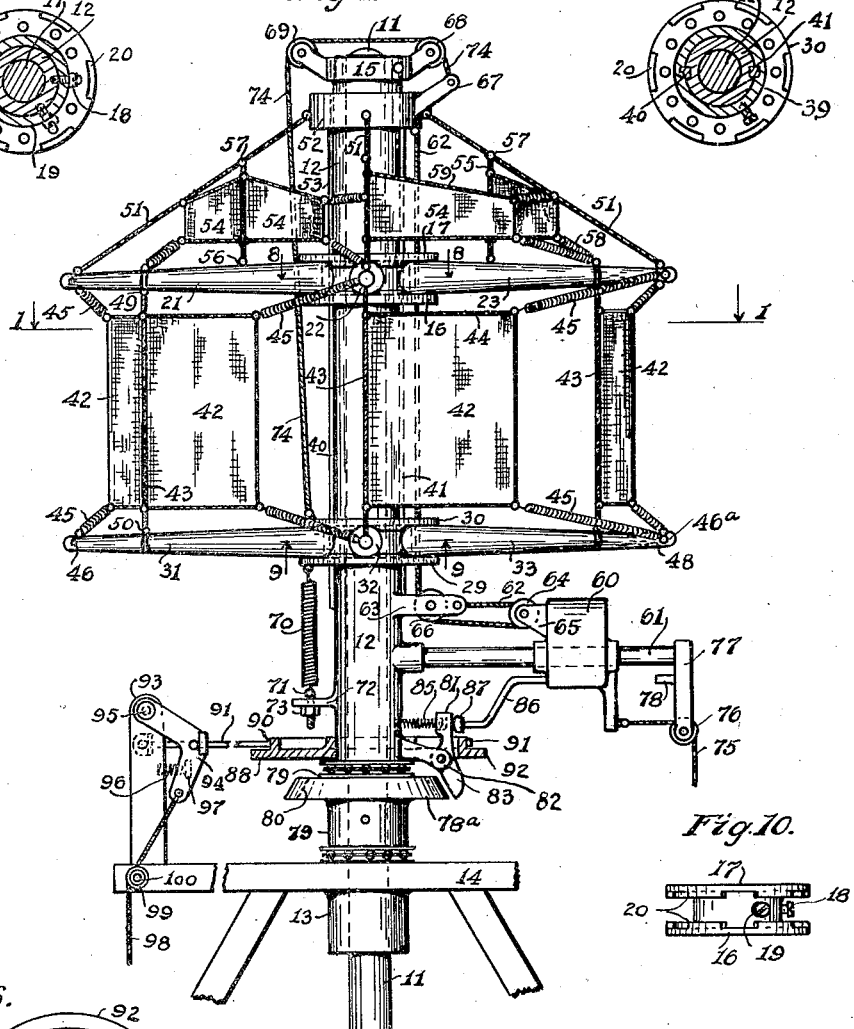
Inventor:
Israel Benjamins.

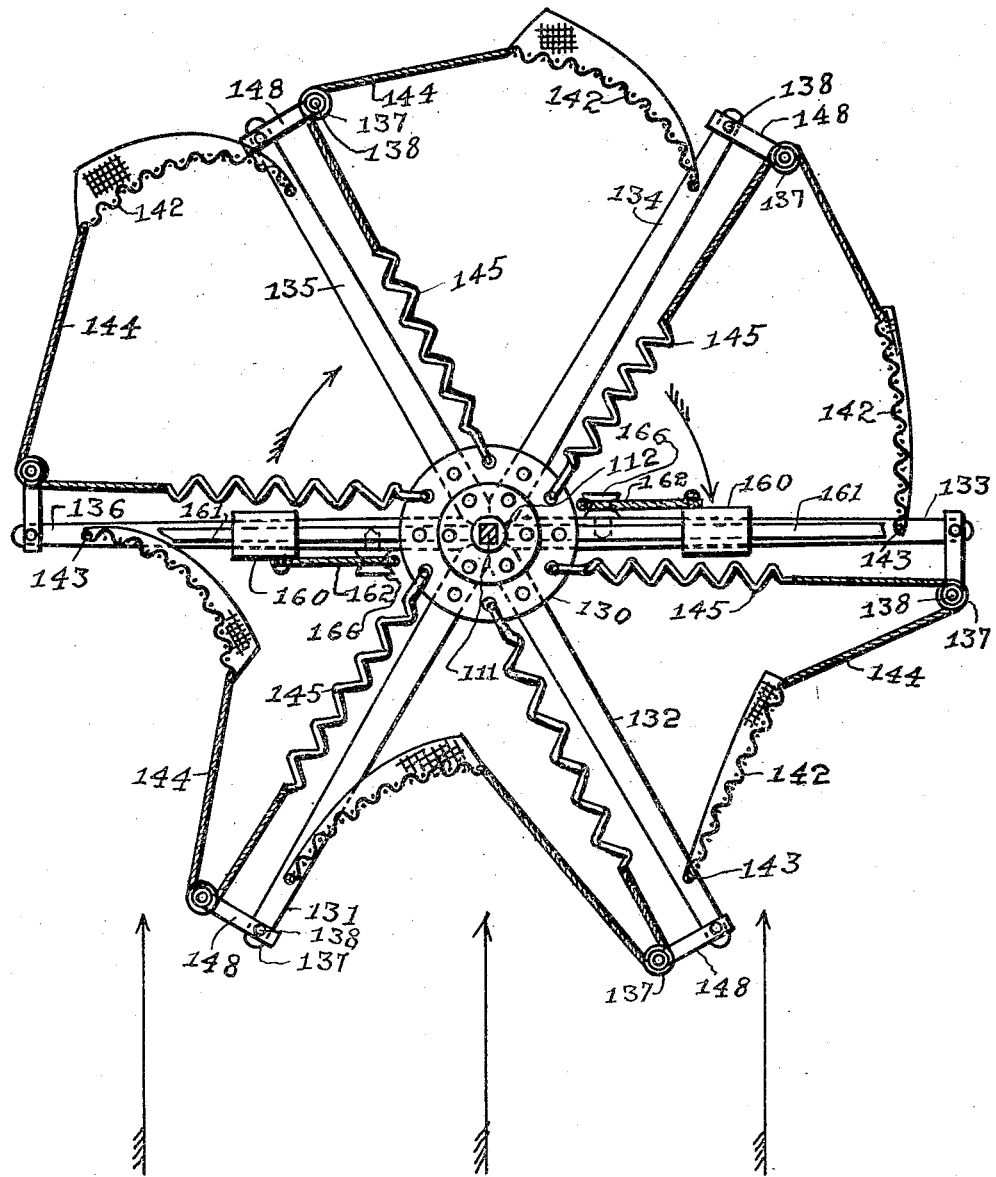

Patented May 12, 1931

1,804,493

UNITED STATES PATENT OFFICE

ISRAEL BENJAMINS, OF BROOKLYN, NEW YORK, ASSIGNOR TO ROSE BENJAMINS, OF BROOKLYN, NEW YORK

FLUID MOTOR

Application filed June 7, 1928. Serial No. 283,511.

My invention relates to improvement in fluid motors and is applicable to both wind motors and water motors; it consists in the novel features, which are hereinafter described.

One of the objects of my invention is—to produce a perfected fluid motor, having a high efficiency and superior strength for the amount of material employed, and, as applied to wind motors, capable of utilizing higher winds for producing power than is being done in practice now.

Another object of my invention is—to produce a fluid motor, which, as applied to water motors, may have the entire power wheel immersed in a stream without having either to dam the stream, as in the case of turbines and over-shot water wheels, or to immerse only a small part of the wheel, as in the case of under-shot water wheels.

Another object of my invention is—to produce a fluid motor, which revolves substantially in a plane parallel to the direction of the stream of water or the wind and having thereon sails or vanes, which are impelled by the fluid through the greater part of the revolution of each of said sails or vanes.

A further object of my invention is to produce a fluid motor of the above type, which has a more or less balanced pressure on the shaft bearing, whereby said motor, when used as a wind motor, may be employed for the propulsion of boats and ships in addition to other uses, such as generating electricity, pumping water, grinding corn, and producing power for any other purpose; in very small sizes my motor may also be used as a toy or embellishment.

Another object of my improvement is—to provide a means for making the action of fluid motor sails resilient, and to vary and adjust the resilience thereof for winds or streams of various velocities.

A further object of my invention is—to provide a perforated means for collapsing or furling the sails of a wind motor when the velocity thereof is too high, as in excessively high winds or storms or when the load of the wind-motor is too low or light, and to have said collapsing means both manual and automatic; also to provide a means for varying and adjusting the action of said collapsing means for various winds and loads.

Another object of my invention is—to provide a means for disconnecting the loadshaft in a windmotor or windmill from its windwheel when the velocity of the latter is too low, as when the wind is too weak or the load too great, thereby enabling a windmotor to utilize low winds for intermittently revolving its loadshaft.

A further object of my invention is—to provide a means for collapsing or furling the sails of a power wheel from a distance as from the floor or ground.

Another object of my invention is—to supply a substantially horizontal power wheel with a brake and a means for operating the same from a distance, as from the ground or floor.

A further object of my invention is—to have said fluid motor simple, durable and inexpensive.

Other objects and advantages will hereinafter appear.

I attain these objects by the fluid motor, one form of which is illustrated in the accompany drawings, or by any mechanical equivalent or obvious modification of the same.

In the drawings Fig. 1 is a sectional plan or top view of one form of my fluid motor when the latter is not in action and as applicable mainly to windmotors on the line 1—1 of Fig. 2, omitting some details.

Fig. 2 is a fragmentary side view of said motor mainly in elevation, but showing a brakewheel in section on the line 2—2 of Fig. 6, and omitting some parts.

Fig. 3 is a detail in plan view of a clutch disc, which is hereinafter described.

Fig. 4 is a detail in elevation of a clutch lever, which is hereinafter described, and parts adjacent thereto.

Fig. 5 is a sectional plan on the line 5—5 of Fig. 4.

Fig. 6 is a detail in plan view of a brake wheel, which is hereinafter described.

Fig. 7 is a detail of the end of one of the sail arms of my fluid motor, which is hereinafter described, and parts which are connected thereto.

Figs. 8 and 9 are sections on the lines 8—8 and 9—9 of Fig. 2 respectively, showing details of the hubs of my fluid motor, which are hereinafter described; Fig. 8 is also a section on the line 8—8 of Fig. 10.

Fig. 10 is an elevation of the hub shown in either Fig. 8 or Fig. 9.

Fig. 11 is a sectional plan or top view of another form of my fluid motor, showing the sails of the latter in action, the sections being in a plane passing through the upper edges of the sails, which are hereinafter described.

11 designates a load shaft, which is shown as substantially vertical, but may be otherwise positioned, if desired, and 12—a sleeve, which is swivelled thereon; a bearing 13 for said shaft 11 is shown as mounted on a tower 14, of which only the upper end is shown in Fig. 2.

The sleeve 12 has secured thereto at the upper end thereof a collar 15 for a purpose, which is hereinafter described.

The sleeve 12 has secured thereto a hub 16—17, which may consist of two hub plates 16 and 17, as shown in Fig. 10.

The hub 16—17 has secured thereto by means of suitable fastenings outwardly extending sail arms 21, 22, 23, 24, 25 and 26, which may be rectangular in cross-section at the inner ends thereof and round at their outer ends, as shown in Fig. 2; said fastenings also serve to hold together the said hub-plates 16 and 17.

A pair of set screws 18 in a socket 19 on said hub-plate 16 serves to secure said hub 16—17 to said sleeve 12.

Jaws or projections 20, which are shown in Figs. 8 and 10, are provided on said hub-plates 16 and 17, interiorly thereof, for spacing said arms 21—26 from each other.

Similar arms 31 to 36 inclusive are shown in Fig. 2 as secured to a hub 29—30, which consists of two hub plates 29 and 30, and is in spline-sliding engagement with said sleeve 12, as shown in Fig. 9.

The outer appearance of said hub 29—30 is identical with that of the hub 16—17 as shown in Fig. 10, except that the set screws 18 may be omitted or kept unengaged with said sleeve 12 when the motor is in operation.

A pair of splines 40 are secured to said sleeve 12 and slidably fit corresponding groove 41 in a socket 39 on said hub 29—30 and in said plates 29 and 30 of said hub, whereby the latter may be moved lengthwise said sleeve 12 without turning with relation thereto.

In the modification shown in Fig. 11 a shaft 111 is employed, which is square in cross-section; hub plates 130 are used to hold two sets of sail arms, such as 131 to 136 inclusive; said plates 130 have thereon hubs 112; the hub of one set of sail arms or spiders may be secured to said shaft 111 and the hub of the other may slide on it.

The upper set of sail arms or spider is not shown in Fig. 11, the section having been taken below it; but the arrangement is similar to that of Fig. 2.

Sails 42, which in the case of windmotors are preferably made of fabric, such as canvas, but may also be of any other suitable material, are shown in Figs. 1 and 2 in their shape when there is no wind and as initially positioned; and in Fig. 11 sails 142 are shown in action when the motor is in operation; the sails 42 are shown as having their leading parts flexibly connected to said arms 21—26 and 31—36 at points 49 and 50 respectively by means of vertical cords 43, to which said sails 42 may be secured in any suitable manner. In Fig. 11 the sails 142 are similarly connected to vertical cords 143, which connect the two sets of sail arms to each other as in Fig. 2.

The said flexible connections at 49 and 50 allow said sails 42 to be either deflected or turned at said points 49 and 50. The sails 142 are also free to turn or be deflected to one side or the other rearwardly of said cords 143.

The position of said sails 42 with relation to said points 49 and 50 and said cords 43, also the position of said sails 142 with relation to said cords 143 is substantially fore and aft, as is the case with sails on schooner-rigged sailing vessels; the vertical cords 43 and 143 correspond to the masts of the sailing vessels, and revolve with said sail arms in the direction as indicated by the curved arrows in Figs. 1 and 11, and the pressure on the deflected sails is always to impel the motor in the direction as indicated by said arrows as is evident from Fig. 11, where the straight arrows show the direction of the wind or current and the curved arrows the direction of rotation of said sails 142.

The upper and lower edges of said sails 42 are shown in Fig. 2 as reinforced by horizontal cords 44, which are omitted in Fig. 1.

When applied to water motors vanes made of plates or boards may be used instead of fabric in said sails 42.

The follower ends or tail ends of said sails 42 are shown in Fig. 1 as yieldably connected to springs 45, which are in turn connected to eyes 46a of eyebolts 46 at the ends of said arms 21—26 and 31—36, which are shown in Figs. 1 and 7.

In Fig. 11 springs 145 are connected at their rear ends to said hubs 130 and at their leading ends to cords 144, which are connected to said sails 142 and pass over pulleys 137, which are pivotally connected by means of pins 138 to brackets 148 at the ends of said sail arms 131—136 of each spider.

Said springs 45 and 145 keep said sails 42 and 142, when the latter are made of a fabric, from unduly drooping or loosely hanging downwardly; they also serve to take up shocks, which in windmotors may be due to sudden gusts of wind; also, in windmotors, to keep the sails to the wind when the latter has a low velocity and to allow the sails to yield and be deflected more in higher winds than in lower winds, in this way said springs serve as pressure regulators for said sails.

In the application of my motor to windmotors the tension of said springs 45 may be varied and adjusted for different winds by means of said eyebolts 46 and nuts 47, which are shown in detail in Fig. 7, where the ends of one of said sail arms is shown as provided with a cap 48, which may preferably be of metal, while said sail arms may be of wood; an opening is provided in said cap 48 and through the end of said sail arm for an eyebolt 46 to pass therethrough; by turning the nuts 47 in one direction the eyebolts 46 may be made to stress said springs 45, and by turning said nuts 47 in the opposite direction said springs may be relaxed.

In the application of my motor to water motors, the above adjusting means, though not as essential as in wind-motors, may also be employed where the velocity of the current in the stream varies from time to time to a considerable extent.

Other resilient means than springs and other than resilient means may be employed for yieldably connecting the follower ends of said sails 42 to said sail arms, if desired.

In cheaper wind-motors and in some water-motors the springs 45 and 145 may be replaced by yieldable flexible members, such as cords or chains, which may be long enough to allow the follower ends of said sails to be deflected, if desired.

It is evident that the wind or stream of water will act on each of the sails 42 or 142, after deflecting the same, as shown in Fig. 11, practically through a complete revolution of the motor, except for an instant when the sail happens to be in line with the direction of the wind or stream of water.

The position of my motor to revolve in a substantially horizontal plane will enable it as a windmotor to respond to winds from any and all directions without having to be turned to the wind.

However, my fluid motor may be placed to revolve in a plane, which is parallel to the direction of the stream or the wind in any position other than horizontal, if desired; it may then be turned to the direction of the wind or stream in any suitable way, if desired.

It is evident that by placing the power wheel of my motor to revolve in a plane, which is parallel to the stream or the wind, the action of my motor is then more analogous to that of Pelton water wheels than to the action of the propeller type of windmills, which have their sails revolving in a plane perpendicular to the direction of the wind.

It, therefore, follows that a much lower velocity will be necessary for maximum efficiency in my fluid motor than in the windmills of the propeller type; this is a source of great strength in my motor when used as a windmotor, as will be readily understood by persons who are well versed in mechanics and the theory of prime movers such as waterwheels and windmills.

My motor when used as a windmotor may, therefore, safely be run in much higher winds than windmills of the propeller type, and a great deal more power may, therefore, be developed by my fluid motor for any given size thereof than by windmills of current practice of the same size.

The springs 45 and 145 in my motor when used as a windmotor will partly neutralize the effects of high winds and storms by reducing the cross-section of the effective area of the stream of wind, which is acting on each of said sails 42, and 142, thereby serving as a pressure regulator for said sails and for a high load said springs 45 may suffice as a speed regulator of my motor used as a windmotor; however, if the load be insufficient for very high winds or storms, the sails 42 and 142 may be collapsed or furled, either partly or entirely, by a speed regulator, which is hereinafter described.

To increase the stability of said sail arms 21—26 in wind-motors I provide guy-ropes or cords 51, which are shown as extending from the ends of said sail arms to a ring 52, which is shown as normally positioned at or near the upper end of said sleeve 12 and is in spline sliding engagement therewith, for a purpose, which is hereinafter described, by means of a pair of splines 53 on said sleeve 12 and a corresponding pair of grooves in said ring 52 interiorly thereof.

Auxiliary sails 54 are shown as having their leading parts flexibly connected to said arms 21—26 and cords 51 by means of substantially vertical cords 55 at points 56 and 57 respectively.

The follower parts of said sail 54 are connected to springs 58 at the inner ends thereof; the other ends of said springs 58 are shown as connected to said arms 21—26 and cords 51 in a way to have said sails 54 positioned substantially fore and aft from said points 56, 57 and said cords 55.

The springs 58 are indicated in Fig. 2 of the drawings; the upper and lower ends of said sails 54 are shown as re-inforced by cords 59; said sails 54 are omitted in Fig. 1 of the drawings.

The sails 54 may be made triangular instead of trapezoidal as in Fig. 2 of the drawings; the follower end of each of said sails 54 may then terminate in an angle and be connected to one of said springs 58 at the inner end thereof; the outer ends of said springs 58 may then be connected to said arms 21—26 by means of eyebolts, in the same way as said springs 45, and have their tension also adjusted by suitable nuts, if desired.

The sails 54 resemble jib-sails in appearance, and their action is similar to that of said sails 42 and 142.

In smaller sizes of wind-motors or in cheaper ones the sails 42 or 142 may be omitted and only the sails 54 with only one set of sail arms may be retained.

Revolving members other than the above described hubs and sail arms may be employed, if desired.

To regulate the speed of my fluid motor, especially when used as a wind-motor in extremely high winds or when the load is insufficient for the wind, I provide a centrifugal body 60, which is shown as slidably mounted on a guide rod 61, which is shown in Fig. 2 as connected to said sleeve 12. A pair of centrifugal bodies or slides 160 may be used, as shown in Fig. 11, where they slide on a pair of guides 161, which are connected to one of said hubs 130.

In the form of my motor shown in Figs. 1 and 2 a flexible member 62, which may be either a chain or a cord, has one end thereof connected to a block 63, which is secured to said sleeve 12, passes over a pulley 64 in a block 65, which is secured to said body 60, and then over a pulley 66 in said block 63; then said cord 62 extends upwardly and has its upper end connected to said ring 52.

Another flexible member or cord 74 has one end thereof secured to a lug 67 on said ring 52, passes over guide pulleys 68 and 69, pivotally connected to suitable extensions or lugs on said cap 15, which is carried by said sleeve 12, then extends downwardly, and has its other end connected to the hub-plate 30 of said hub 29—30.

A spring 70 is connected at one end thereof to the hub-plate 29 of said hub 29—30 and at the other end thereof to the eye of an eyebolt 71, which passes through a horizontal lug or flange 72 on said sleeve 12 and is kept in position by a nut 73, which is abutting against the underside of said flange 72.

By turning said nut 73 the initial tension of said spring 70 may be varied and adjusted to balance the centrifugal force of said body 60 as transmitted by the above flexible members 62 and 74 for different winds.

The pulley blocks 64 and 66 serve to reduce the motion of said body 60 from said ring 52 and hub 29—30.

When the velocity of the motor becomes too high, as when either the wind is too high or the load is too low, the body 60 will slide on its guide 61 from left to right in Fig. 2, in opposition to the force of said spring 70, thereby causing said ring 52 and said hub 29—30 to slide on said sleeve 12 towards said hub 16—17, whereby said sails 54 and 42 are gradually collapsed or furled up. In the form of my motor shown in Fig. 11 the slides 160 are each connected by means of a cord 162 passing over a pulley 166 to a point in the lower set of arms or spider, while said guides 161 with said slides 160 thereon are placed at a higher elevation; the outward motion of said slides 160 raises the said lower spider, thereby furling or partly furling said sails 142 and thereby checking the velocity of the motor.

A small extent of collapsing of said sails 42 or 142 and 54 may tend somewhat to increase their power by making them concave; but, as the velocity of said body 60 or said slides 160 increases still further, said sails will be collapsed more and more and their power reduced until the velocity of said body 60 or said slides 160 will remain stationary and in the form of my motor, shown in Fig. 2 will be balanced by the tension of said spring 70 as transmitted by said cords 62 and 74.

When the velocity of said body 60 is reduced, the tension of said spring 70 will cause said hub 29—30 and ring 52 with said sails to return to their normal position, thereby extending said sails. In the form of my motor, shown in Fig. 11, the spring 70 is omitted and the weight of the lower spider is designed to balance the centrifugal force of said slides 160.

The above speed-regulating means may also be applied to water motors, if desired, as when the velocity of the current in the stream may vary from time to time; but the said speed regulating means is most important in the application of my fluid motor to wind-motors.

To collapse or furl said sails 54 and 42 manually in windmotors from a point below the motor, or in watermotors at a distance from the power wheel, when desired, I provide a cord 75, which has one end thereof connected to said body 60, passes over a guide pulley 76 in a bracket 77, which is shown as secured to said rod 61 and extends in wind-motors downwardly to any desired point, such as a point within reach from the floor or ground.

By pulling on said cord 75 from said lower point the body 60 may be slid outwardly on said rod 61 and said sails collapsed as hereinbefore described.

Said manual collapsing means may be omitted in smaller or cheaper motors; the outward motion of said body 60 may then be limited by a stop 78 as an additional precaution against accidents due to a possible failure of said spring 70.

To enable my fluid motor, when used as a windmotor, to utilize low winds or to work with excessively high loads I provide a means for automatically disconnecting the power wheel from the load shaft when the velocity of the former is too low, to enable it to pick up speed, whereupon it may be operatively connected to said shaft again and work the latter intermittently; said disconnecting means may also be applied to water motors, if desired.

A clutch disc 78a may be secured to said shaft 11 by means of a socket 79 on the former and a suitable fastening, as shown in Figs. 2 and 3; said disc 78a is provided with one or more notches 80 on the periphery thereof.

A clutch lever 81 is pivotally connected to lugs 82 on said sleeve 12 and terminates at the lower end thereof in a latch 83, to fit said notches 80, and at the upper end thereof in a plate 84, which is in contact with a compression spring 85; the latter is shown in Fig. 2 as abutting at one end thereof against said plate 84 and extending at the other end thereof into a cavity in said sleeve 12.

A reach rod 86 is shown in Fig. 2 as secured at one end thereof to said body 60 and terminating at the other end thereof in a head or knocker 87, which is in contact with said plate 84, when the velocity of said body 60 is too low as compared with that of the wind or current of water in a stream, under the influence of said spring 70, which is initially stressed by said nut 73, as hereinbefore described, and in opposition to said spring 85, which is weaker than said spring 70.

When the velocity of said body 60 increases sufficiently to overcome the resistance of said spring 70, it starts to move outwardly, or to the right in Fig. 2, thereby causing said knocker 87 to release said plate 84, which is then actuated by said spring 85, whereby said latch 83 is made to engage one of the notches 80 in said disc 78a and thereby operatively connecting the windwheel carried by said sleeve 12 to said shaft 11.

When the velocity of the power wheel and the body 60 is reduced again to a certain point, said body 60 returns to the position shown in Fig. 2 and the knocker 87 disengages said lever 81—83—84 from said disc 78a.

The velocity of the power wheel at which the above described two-part clutch is disengaged may also be varied and adjusted by means of said nut 73 and eyebolt 71, by means of which the tension of said spring 70 may be made initially lower for low winds or currents than for high winds or currents of water in streams.

Other forms of clutches may be employed and other means than clutches may be used for disconnecting the power wheel from the load shaft, if desired.

The power wheel may also be manually connected to said shaft 11 by means of said cord 75, if desired, and disconnected therefrom by tightening said nut 73.

A slight motion of said body 60 on said rod 61, although sufficient to actuate the above described clutch, will not affect the action of said sails 54 and 42 to any great extent.

To arrest the motion of the power wheel, when necessary, I provide a brakewheel 88, which is shown in section in Fig. 2 and in plan view in Fig. 6; it has thereon a socket 89, which may be secured to the lower end of said sleeve 12 by means of suitable fastenings, which are omitted in the drawings, a rim 90, for a suitable brake 91 to act upon, and a horizontal flange 92 to keep said brake 91 from sliding down and off said rim 90.

One end of said brake 91, which may be either a flexible or semi-flexible band, is shown in Figs. 1 and 2 as secured by means of a suitable fastening to a post 93, which in windmotors may form a part of or be connected to said tower 14; the other end of said brake band 91 is shown as connected to a lever 94, which is pivotally connected to said post 93 at 95.

A compression spring 96 abuts at one end thereof against a plate 97 on said lever 94 and at the other end thereof extends into a cavity in said post 93; it tends to turn said lever 94 in a direction to keep said band brake 91 loose on said brake-wheel 88.

A flexible member or cord 98 is shown in Fig. 2 as connected at one end thereof to the end of said lever 94; it passes over a pulley 99 on a pin 100, which may be secured to said tower 14, and extends, in windmotors, downwardly to a point below said brake, such as the ground or floor, and in watermotors to a point at a distance from said brake wheel.

By pulling on said cord 98, the lever 94 is turned in a direction to tighten said brake 91 on to the rim 90 of said wheel 88, in opposition to the force of said spring 96, whereby the rotation of said sleeve 12 with the power wheel thereon is arrested.

Suitable cleats may be provided on said tower 14 near the base thereof for connecting said cord 98 thereto, if desired.

In my motor, used as a windmotor, the number of rotary members and windwheels may be increased on said sleeve 12 or on said shaft 111, and more than one sleeve 12 or pairs of hubs 130, each carrying one or more power wheels as above described, may be mounted on one vertical load shaft or on a stationary mast, if desired.

The sails of my motor may also be of any material other than fabric or canvas, if desired, and the speed regulating and sail collapsing devices above described may be employed also with power wheels other than as hereinbefore described.

Other sail collapsing means and other speed regulating means may also be employed, if desired.

The extension or travel of the inner ends of the springs 45 or 145 and 58 may be reduced from the motion of the follower ends of the sails 42 or 142 and 54 respectively by means of pulley blocks and cords in the same way as the motion of said body 60 is reduced from the motion of said ring 52 and hub 29—30, if desired.

Many other changes may be made in my fluid motor and the sundry parts and appurtenances thereof without departing from the main scope of my invention, and parts of my invention may be used without other parts.

I do not, therefore, restrict myself to the details as shown in the drawings; but I intend to include also all mechanical equivalents and obvious modifications of the same within the scope of my invention.

Wherever the term "collapsing" is used in the claims hereinafter, as referred to sails, it means either the folding, furling or gathering of the sails in any manner; the term "sails" is meant to include also vanes made of plates and boards. The term "flexibly connected" is meant to include also pivotal connections.

By the term "fore-and-aft" is meant the disposition of a sail or part of sail with its leading edge or end flexibly connected to a member in a vertical plane, such as a mast or cord, and the follower edge or end to be deflected to one side or the other of the line of travel of said sail by the wind or current in a way to transmit the impulse of said wind or current in the direction of said travel.

I claim as my invention and desire to secure by Letters Patent:—

1. In a fluid motor a power wheel, a load shaft loaded for relatively high winds, a means for operatively connecting said wheel to said shaft, an automatic means for disconnecting the same at low speeds of said wheel and a means for varying and adjusting the action of said disconnecting means.

2. In a fluid motor a power wheel, a load shaft, loaded for relatively high winds, and a means for enabling said motor to utilize relatively low winds, said means comprising an engaging member, controlled by the speed of said wheel, for operatively connecting said wheel to said shaft at relatively high speeds of said wheel, and a means for disengaging said member at relatively low speeds of said wheel, thereby disconnecting said wheel from said shaft and thereby enabling said wheel to develop speed and intermittently drive said shaft at low winds.

3. In a fluid motor a power wheel, a load shaft, loaded for relatively high winds, and a means for enabling said motor to utilize relatively low winds, said means comprising a two-section clutch, controlled by the speed of said wheel, for operatively connecting said wheel to said shaft at relatively high speeds of said wheel, and a means for disengaging said sections from each other at relatively low speeds of said wheel, thereby disconnecting said wheel from said shaft and thereby enabling said wheel to develop speed and intermittently drive said shaft at low winds.

4. In a fluid motor a power wheel, a load shaft, loaded for relatively high winds and a means for enabling said motor to utilize relatively low winds, said means comprising an engaging member, for operatively connecting said wheel to said shaft at relatively high speeds of said wheel and an automatic means for disengaging said member at relatively low speeds of said wheel, thereby disconnecting said wheel from said shaft and thereby enabling said wheel to develop speed and intermittently drive said shaft at low winds.

5. In a fluid motor a power generator, comprising a pair of rigid rotary sail impelled members, having a common axis of rotation, outwardly extending parts on said members and sails, connected thereto at their opposite ends, in a way normally to impel the same, thereby generating power, and a means for moving said members in a direction parallel to said axis towards each other with relation to each other, thereby collapsing said sails.

6. In a fluid motor a power generator, comprising a pair of rigid rotary sail impelled members, having a common axis of rotation, outwardly extending parts on said members and sails connected thereto in a way normally to impel the same, thereby generating power, and a means for collapsing said sails by moving said members in a direction parallel to said axis towards each other with relation to each other, said means including a body, arranged to have a centrifugal motion in a plane parallel to the plane of rotation of said members.

7. In a fluid motor a power generator, comprising a rotary sail impelled member, a pair of other rotary sail impelled members, one at each end of said first mentioned member along the same axis of rotation, outwardly extending parts on said members and sails connected at their ends to said first mentioned member and to each of said other members in a way normally to impel the same, thereby generating power, and a means for moving said other members in a direction parallel to said axis towards said first mentioned member, thereby simultaneously collapsing said sails.

8. In a fluid motor a power generator, comprising an inner rotary member, an outer rotary sail impelled member, secured thereto, one or more outer rotary said impelled members, in sliding engagement with said inner member lengthwise the axis of rotation thereof, and sails, connected at their ends to each of said outer members in a way normally to impel the same, thereby generating power, and a means for slidably moving said last mentioned outer members along said inner member towards said first mentioned outer member, thereby collapsing said sails.

9. In a fluid motor a power generator, comprising a pair of rigid rotary sail impelled members, having a common axis of rotation, outwardly extending parts on said members and sails, connected thereto at their opposite ends in a way normally to impel the same, thereby producing power, and an automatic means for moving said members in a direction parallel to said axis towards each other with relation to each other, thereby collapsing said sails.

10. In a fluid motor a power generator, comprising a pair of rigid rotary sail impelled members, having a common axis of rotation, outwardly extending parts on said members and sails, connected thereto at their opposite ends in a way normally to impel said members, thereby producing power, and a manual means for moving said members in a direction parallel to said axis towards each other with relation to each other, thereby collapsing said sails.

11. In a fluid motor a power generator, comprising a pair of rigid rotary sail impelled members, having a common axis of rotation, outwardly extending parts on said members and sails, connected thereto at their opposite ends in a way normally to impel said members, thereby producing power, a means for moving said members in a direction parallel to said axis towards each other with relation to each other, thereby collapsing said sails, and a means for varying and adjusting the action of said moving means.

12. In a fluid motor a substantially horizontally disposed rotary member, one or more substantially vertically disposed elements connected thereto, one or more sails, having thereon parts, which are normally positioned each substantially fore and aft from said elements, transversely to the plane of rotation thereof and flexibly connected thereto, a centrifugal means disposed to act in a substantially horizontal plane, carried by said member and connected to said sails in a way to check the speed of said rotary member, and a retaining means on said member distinct from and acting in opposition to the influence of said centrifugal means, connected to said sails, thereby yieldably keeping said sails in operative position.

ISRAEL BENJAMINS.

CERTIFICATE OF CORRECTION.

Patent No. 1,804,493.                  Granted May 12, 1931, to

ISRAEL BENJAMINS.

It is hereby certified that error appears in the printed specification of the above numbered patent requiring correction as follows: Page 1, line 45, for the word "perforated" read perfected; and that the said Letters Patent should be read with this correction therein that the same may conform to the record of the case in the Patent Office.

Signed and sealed this 14th day of July, A. D. 1931.

(Seal)                                                  M. J. Moore,
                                                          Acting Commissioner of Patents.